United States Patent [19]
Yamanaka

[11] 3,759,154
[45] Sept. 18, 1973

[54] DEVICE FOR AUTOMATICALLY FIRING FLASH BULBS IN CAMERA

[75] Inventor: Akira Yamanaka, Osaka, Japan

[73] Assignee: Minolta Camera Kabushiki Kaisha, Osaka, Japan

[22] Filed: May 17, 1971

[21] Appl. No.: 144,187

[30] Foreign Application Priority Data
May 19, 1970 Japan................................ 45/43228
May 30, 1970 Japan................................ 45/46554

[52] U.S. Cl. ............... 95/11.5 R, 95/11 L, 95/10 C, 240/1.3, 431/92
[51] Int. Cl. .......................................... G03b 15/04
[58] Field of Search ..................... 95/11.5 R, 11 R, 95/11 L, 10 C; 240/1.3; 431/92, 93

[56] References Cited
UNITED STATES PATENTS

| | | | |
|---|---|---|---|
| 3,616,735 | 11/1971 | Bresson............................ | 95/11.5 R |
| 2,972,937 | 2/1961 | Suits................................. | 95/11.5 R |
| 3,602,120 | 8/1971 | Gaibraith, Jr..................... | 95/11.5 R |
| 3,250,193 | 5/1966 | Horton.............................. | 95/10 C |
| 3,273,482 | 9/1966 | Starp................................ | 95/10 C X |
| 3,464,333 | 9/1969 | Aoki et al. ....................... | 95/10 C |

*Primary Examiner*—Robert P. Greiner
*Attorney*—Stanley Wolder

[57] ABSTRACT

The device includes an ignition initiating member to be tensioned in operative relation to tensioning of a shutter opening member and locked in the tensioned position by two retaining members. Only when flashlight is required for taking a photograph, the ignition initiating member is disengaged from the first of the two retaining members by the movement of a member responsive to the brightness of the subject upon shutter release. In synchronism with the action of the shutter opening member, the ignition initiating member is further released from the second retaining member. The ignition initiating member functions to fire the flash bulb only when freed from engagement with both of the retaining members by effecting the striking of a piezo-electric element whose electrical output ignites the flash bulb or the striking of the leg of a percussion ignitable flash bulb.

7 Claims, 6 Drawing Figures

INVENTOR
AKIRA YAMANAKA

BY

ATTORNEY

DEVICE FOR AUTOMATICALLY FIRING FLASH BULBS IN CAMERA

BACKGROUND OF THE INVENTION

The present invention relates to a device for automatically firing flash bulbs in camera, more particularly to a device to be used in camera equipped with a flash bulb for automatically firing the flash bulb only when the brightness of a subject is low and it is therefore impossible to take a photograph without firing the flash bulb.

A camera is already known which is equipped with a flash unit incorporating several flash bulbs. With such camera, the flash bulb is fired where there is a need to take a flash photograph and every time a flashlight exposure is made, the flash unit is turned a predetermined angle to bring a new unused flash bulb to the front of the camera. However the camera of this type heretofore known is generally complex in firing system and is not sufficiently reliable in operation. For example, the flash bulb can not always be fired in correct synchronism with the opening of the sector or it may be fired when unnecessary. These are drawbacks so far experienced.

SUMMARY OF THE INVENTION

An object of the present invention is to provide a mechanism to be incorporated in a camera of the above-mentioned type equipped with a flash bulb whereby the flash bulb can be fired reliably in synchronism with opening and closing of the sector only when there is a need to take a flash photograph.

Another object of this invention is to provide a mechanism as described above for automatically firing a flash bulb with a very simple construction.

Still another object of this invention is to provide a device wherein a mechanical operation member for firing flash bulbs will not in the least interfere with rotation of the flash unit.

In accordance with this invention, there is provided an ignition initiating member to be tensioned or cocked in operative relation to tensioning of a member for opening and closing the sector and to be locked in the tensioned position by two retaining members.

The ignition initiating member is pivotally mounted on the camera body at a desired portion thereof and serves to cause an intense impact on a piezo-electric element and thereby produce an instantaneous current therein to be applied to the flash bulb for ignition. In accordance with another system, the flash bulb, instead of being fired by the current from the piezo-electric element, is fired by being struck on the ignition portion in its leg. In such system, the ignition initiating member above operates an intermediate member for actuating a striking member provided on a flash bulb or flash unit holder and adapted to strike the leg portion.

In accordance with the system employing a piezo-electric element for firing the flash bulb, the piezo-electric element is electrically connected to the flash bulb and the flash bulb is fired by a current produced the moment the piezo-electric element is struck by the ignition initiating member.

Further with the system wherein the flash bulb is fired by an impact on the leg portion thereof, the striking member is held engaged on the flash bulb holder always in energized state and the flash bulb is fired by being struck on the leg portion by the striking member the moment it is released by an intermediate member in response to the action of the ignition initiating member.

Only when the brightness of the subject is low and flashlight exposure is therefore required, the first of the two retaining members serving to lock the ignition initiating member at the tensioned position is caused to release the ignition initiating member by a member whose advance position is determined by the brightness of the subject which functions in operative relation to a release member to be operated upon shutter release and which moves by a different amount, for instance, upon detection of the movement of pointer of the exposure meter.

The second retaining member is adapted to release the ignition initiating member under the action of the shutter opening member in synchronism with the opening and closing of the sector.

Thus, only when freed from engagement with the two retaining members, the ignition initiating member moves from the tensioned position to fire the flash bulb as already described.

It will now be apparent that in accordance with this invention, the flash bulb is not fired unless the two retaining members release the ignition initiating member from the locked position, the first retaining member being adapted to disengage the ignition initiating member only when it is necessary to take a flash photograph, the second retaining member acting to disengage the ignition initiating member in complete synchronism with opening and closing of the shutter. Accordingly, flash photographs can be taken with very high reliability.

In addition, the present device for automatically firing flash bulbs has a remarkably simplified construction comprising a very small number of parts.

With the system wherein the flash bulb is fired by impact on the leg portion thereof, the intermediate member for disengaging the striking member is so adapted as to be returned to the original position upon the return of the shutter release member, with the resulting advantage that the flash bulb holder can be rotated free from interference after making an exposure.

Other objects and features of the present invention will become more apparent from the following detailed description of embodiments of this invention.

DESCRIPTION OF THE PREFERRED EMBODIMENTS

Figure 1:
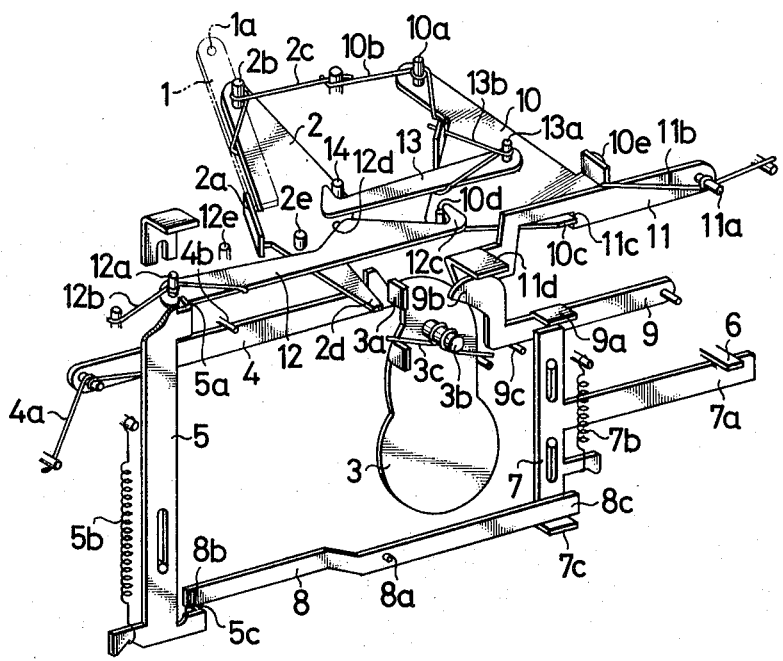
FIG. 1 is a perspective view showing the principal construction of an embodiment of this invention.
Figure 2:
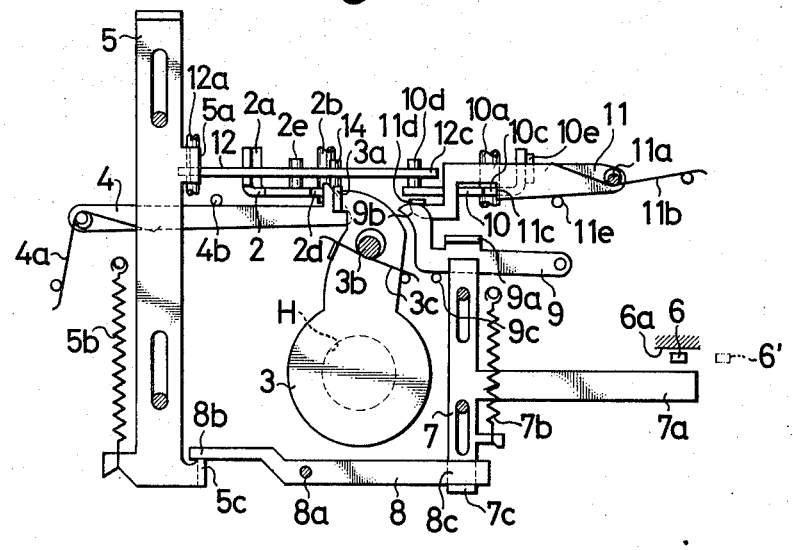
FIG. 2 is a front view of the same.
Figure 3:
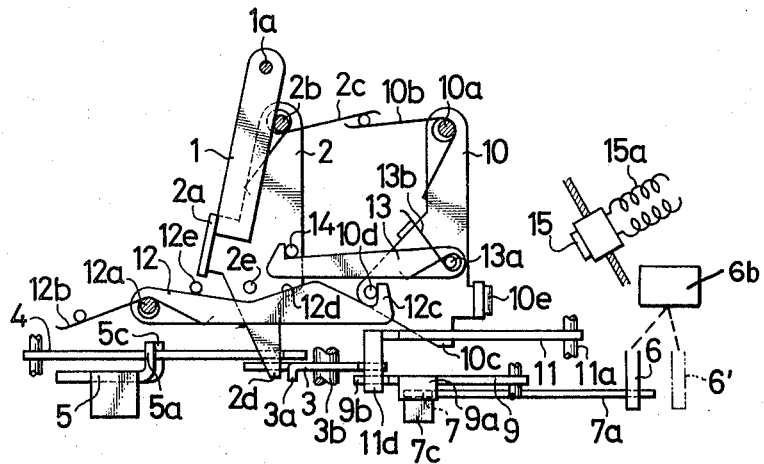
FIG. 3 is a plan view of the same.

FIGS. 1 to 3 illustrate a device for firing the flash bulb by the current derived from impact on a piezo-electric element, the device being shown as the shutter has completely been tensioned. A tensioning member 1 is adapted to be moved is a clockwise direction about a pivot 1a in operative relation to shutter tensioning operation nd and to a halt at the position shown in the drawing. A shutter opening member 2 is adapted to be moved about a pivot 2b to the tensioned position when pushed on its lug 2a by the distal end of the tensioning member 1 and to be moved in a counterclockwise direction under the action of spring 2c upon shutter release, with its distal end 2d pushing the driven portion 3a of a shutter 3 to open and close the shutter 3 as already known. Indicated at 3b is a pivot for the shutter 3, at 3c a return spring for the shutter 3 and at H an exposure opening of the camera. An arresting member 4 for the shutter opening member 2 is pressed against a stopper 4b by a spring 4a and serves to arrest the shutter opening member 2 when the shutter is completely tensioned. Upon shutter release, the arresting member 4 is pushed down by the bend portion 5a of a release member 5 to free the shutter opening member 2. The release member 5 is moved downward in the drawing by depression of an unillustrated shutter button and returned upward when the shutter button is relieved of depression.

A pointer 6 of the exposure meter (6b) is moved leftward in the drawing with the increase in the brightness of the subject. For example, when the brightness of the subject is low and there is a need to use flashlight, it is located at the position 6' indicated in imaginary line in the drawing. A pointer receiving member 6a is fixed to the desired portion on the camera body. A pointer holding member 7 serving to sense the position of pointer 6 which responds to the brightness of the subject has a brightness sensing arm 7a which is movable across the path of pointer 6 and is urged upward in the drawing by a spring 7b.

An interlocking member 8 is mounted on the base plate of the camera body by a pivot 8a, with its driven end 8b in contact with a bent portion 5c at the lower end of the release member 5. The other end 8c of the interlocking member 8 rests on the bent portion 7c at the lower end of the pointer holding member 7. Accordingly, the interlocking member 8 prevents upward movement of the pointer holding member 7 unless the release member 5 is depressed but permits the pointer holding member 7 to move upward in operative relation to shutter release. When the release member 5 is returned upward, the member 8 brings the pointer holding member 7 down to the illustrated position. A speed changing plate 9 detects with its best portion 9a the amount of movement of the pointer holding member 7 upon shutter release. A stopper 9c defines the position of the plate 9 when it is moved down.

When the pointer 6 of the exposure meter is in such position that a photograph can be taken by natural light, the pointer holding member 7 comes into contact with the pointer 6 with its arm 7a upon shutter tensioning and presses the pointer 6 against the pointer receiving member 6a, with the result that the holding member 7 is prevented from further upward movement. When there is a necessity to use flashlight, in other words, when the brightness of the subject is low and the pointer 6 is in the position 6' of the drawing, the arm 7a will not strike the pointer during the upward movement of the holding member 7 and therefore goes upward further beyond the position of the pointer 6.

The device of this invention further includes an ignition initiating member 10 to be tensioned or cocked in operative relation to the shutter opening member 2 and two retaining members 11 and 12 for retaining the ignition initiating member 10 at the tensioned position.

The ignition initiating member 10 is mounted on a pivot 10a on the base plate of the camera body (not shown) and urged by a spring 10b in a counterclockwise direction in the drawing. Mounted by a pin 13a on the initiating member 10 is a hook lever 13 whose hook portion at its distal end is urged by a spring 13b into engagement with a pin 14 implanted in the shutter opening member 2, the ignition initiating member 10 thus being coupled with the shutter opening member 2 when it is tensioned.

The first of the two retaining members 11 and 12 is pivoted at 11a to a suitable portion of the camera body and urged by a spring 11b in a counterclockwise direction as shown in the drawing. The retaining member 11 is formed with a stepped portion 11c with which the projection 10c at distal end of the ignition initiating member 10 comes into engagement when the member 10 is in the tensioned position. The bent portion 11d at distal end of the first retaining member 11 is disposed above the end 9b of the speed changing plate 9. The arrangement is such that when the pointer holding member 7 detects the necessity to take a flash photograph and moves upward, the upward movement of the member 7 pushes the end of the first engaging member 11 through the speed changing plate 9 and thereby causes the first retaining member 11 to move clockwise about the pivot 11a to release the ignition initiating member 10. Indicated at 11e is a stopper for defining the engaging position of the first retaining member 11.

The second retaining member 12 is mounted on a pivot 12a at a desired portion on the base plate within the camera body and urged in a counterclockwise direction by a spring 12b, with its hook 12c in engagement with a pin 10d on the ignition initiating member 10 when the initiating member 10 is in the tensioned position. The second retaining member 12 is formed with a cam portion 12d at a portion positioned above the shutter opening member 2 close to a pin 2e on the shutter opening member 2 so that, when the shutter opening member 2 is moved in a counterclockwise direction upon shutter release, the pin 2e pushes the cam portion 12d and disengages the hook 12c from the pin 10d on the ignition initiating member 10 so as to fire the flash bulb in synchronism with the opening of sector. Indicated at 12e is a stopper for defining the engaging position of the second retaining member.

The ignition initiating member 10 is further provided with a striking portion 10e for a piezo-electric element 15 fixedly mounted on a suitable portion of the camera body. When freed from the engagement with the two retaining members 11 and 12, the ignition initiating member 10 is quickly urged in a counterclockwise direction under the action of the spring 10b to violently hit the piezo-electric element 15 with the striking portion 10e, whereupon the piezo-electric element 15 produces an instantaneous current, which is applied through a lead wires 15a to the ignition portion of an unillustrated flash bulb to fire the bulb.

Thus, unless disengaged from both of the two retaining members 11 and 12, the ignition initiating member 10 is retained in the tensioned position. Only when the brightness of the subject is low and flash photography is required, the first retaining member 11 releases the ignition initiating member 10, while if it is possible to take a photograph by natural light or if there is no need to use flashlight, the first retaining member 11 retains the ignition initiating member 10 at the tensioned position. The second retaining member 12 releases the ignition initiating member 10 in synchronism with opening and closing of the shutter so that only when it is necessary to take a flash photograph the flash bulb will be fired automatically in complete synchronism with opening and closing of the shutter and faulty firing will be avoided.

Figure 4:
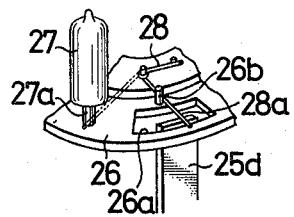
FIG. 4 is a perspective view showing a structure for striking the leg portion of the flash bulb in accordance with another embodiment of this invention.
Figure 5:
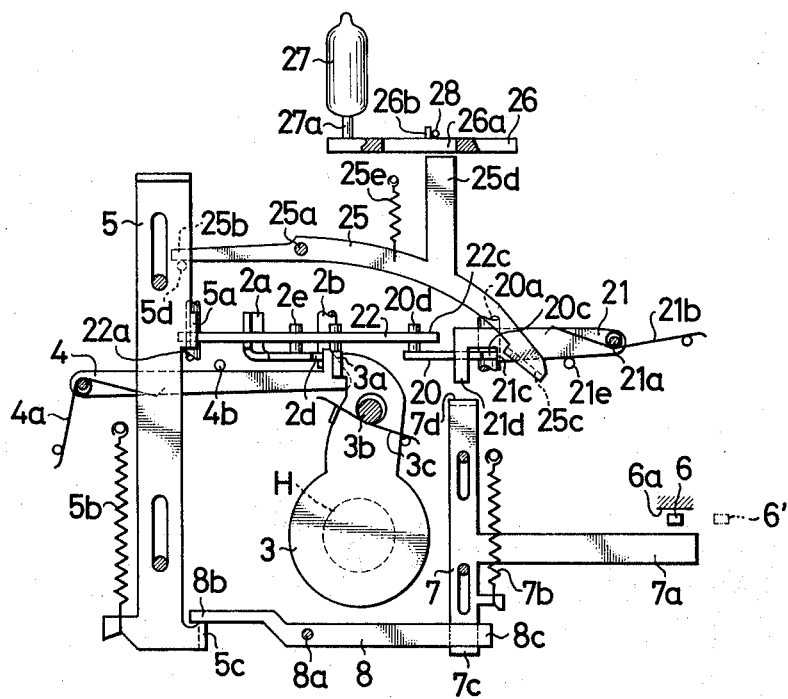
FIG. 5 is a perspective view showing the principal construction of the embodiment of FIG. 4.
Figure 6:
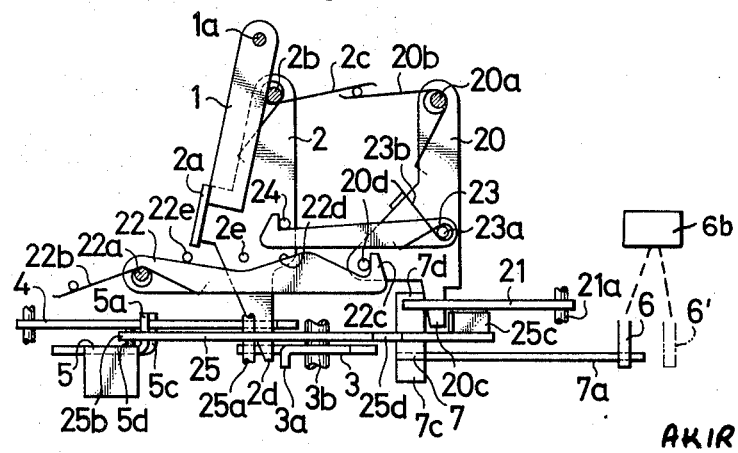
FIG. 6 is a plan view showing part of the same.

FIGS. 4 to 6 show a system wherein the flash bulb is fired by being struck on the leg portion of the bulb. Like numerals on these figures represent like parts in the embodiment of FIGS. 1 to 3, and the speed changing plate 9 in this embodiment is omitted.

An ignition initiating member 20 is mounted on a pivot 20a at a suitable portion of base plate (not shown) of the camera body and is urged in a counterclockwise direction under the action of a spring 20b. The ignition initiating member 20 is retained in the tensioned position by two retaining members 21 and 22. In order that the initiating member 20 may be pivotally brought to the tensioned position in operative relation to tensioning of a shutter opening member 2, a hook lever 23 mounted on a pivot 23a on the member 20 is urged by a spring 23b into engagement with a pin 24 on the shutter opening member 2.

The first retaining member 21 is mounted on a pivot 21a at a suitable portion of the camera body and urged by a spring 21b in a counterclockwise direction, the position thereof being determined by a stopper 21e. The projection 20c at distal end of the ignition initiating member 20 is engaged in the stepped portion 21c of the retaining member 21 for the ignition initiating member 20 to be locked in the tensioned position. Further the driven portion 21d at the end of the first retaining member 21 is positioned above a bent portion 7d formed at the end of a pointer holding member 7 which serves as a member for sensing the position of the meter pointer 6 which responds to the brightness of the subject, the arrangement being such that when the pointer holding member 7 detects the necessity to use flashlight, the holding member 7 pushes up the first retaining member 21 to free the ignition initiating member 20 from engagement with the stepped portion 21c.

When it is not required to use flashlight, the pointer holding member 7 does not push up the first retaining member 21 by the bent portion 7d at its upper end as already described since the amount of its upward movement is limited to a certain range by the pointer 6 of the exposure meter pressed against the receiving member 6a. Only when there is a need to take a flash photograph, the pointer holding member 7 moves upward upon shutter release to push up the first retaining member 21 and thereby release the ignition initiating member 20 from engagement therewith at the tensioned position.

By means of a pivot 22a the second retaining member 22 is mounted on a suitable portion in the interior of the camera body and urged in a counterclockwise direction by a spring 22b. The stopper 22e serves to determine the position of the second retaining member 22. The retaining member 22 extends over the shutter opening member 2 and has a hook 22c extending over the ignition initiating member 20 and engaged with a pin 20d on the member 20 which is in the tensioned position. The retaining member 22 is formed, at a portion positioned above the shutter opening member 2, with a cam portion 22d facing a pin 2e on the shutter opening member 2, the arrangement being such that when the shutter opening member 2 is moved in a counterclockwise direction upon shutter release, the pin 2e pushes the cam portion 22d and thereby free the ignition initiating member 20 from engagement with the hook 22c at the tensioned position so as to fire the flaSh bulb in synchronism with opening of the sector.

The ignition initiating member 20 thus disengaged from the first and second retaining members 21 and 22 at the tensioned position now moves in a counterclockwise direction under the action of a spring 20b thereon to actuate an intermediate member 25 for ignition. The intermediate member 25 is mounted on a pivot 25a at a suitable portion within the camera body and has a tail end 25b engaged with a pin 5d on a release member 5 under a very weak spring 25e. The front end of the intermediate member 25 is bent to provide a slanting lug 25c which is positioned in the path of the projection 20c at the distal end of the ignition initiating member 20 along which it moves pivotally when the member 20 is released from the two retaining members 21 and 22. The projection 20c therefore pushes the slanting lug 25c and moves the intermediate member 25 in a counterclockwise direction in FIG. 5 about the pivot 25a. The intermediate member 25 is further formed with an upwardly extending arm 25d whose upper end is positioned immediately under the flash bulb holder 26 as seen in FIGS. 4 and 5.

Generally, the bottom plate of a flash unit (not shown) or like device serves as the flash bulb holder 26 which is adapted to carry a suitable number of flash bulbs 27 thereon. The holder 26 is further adapted to be rotated a definite angle manually or in operative relation to shutter release every time a flashlight exposure is made so as to bring an unused new flash bulb 27 to the front of the camera. With a structure wherein only one flash bulb is mounted on the holder, there is no need to provide a function to rotate the holder.

As shown in the drawing, the flash bulb holder 26 is formed with a window 26a at the side of the flash bulb 27, the position of the window 26a being such that when the holder 26 is locked in place the upper end of the arm 25d of the intermediate member 25 is located immediately under the window 26a. Thus, when the slanting lug 25c of the intermediate member 25 is pushed up by the foregoing movement of the ignition initiating member 20, the upper end of the arm 25d enters the window 26a to push up and disengage a striking member 28.

It is most convenient to use an elastic member such as a spring as the striking member 28 as seen in FIG. 4. One end of the spring 28 is fixed to the holder 26 and the free end 28a thereof distorted in engagement with a pin 26b on the holder 26 extends over the window 26a so that, when pushed up by the upper end of arm 25d of the intermediate member 25 coming into the window 26a, the spring will jump over the pin 26b and strike the leg 27a of the flash bulb 27 with high impact.

In the construction described above, it is noted that as the release member 5 is moved downward upon shutter release, the intermediate member 25 will be rotated in a counterclockwise direction in the drawing under the action of the spring 25e, permitting its arm 25d to move into the window 26a of the holder 26 into contact with the striking member 28. However, the elasticity of the striking member 28 is so adjusted that the striking member will not be pushed up by the arm 25d under the action of spring 25e which is very weak but will be pushed up and freed from engagement with the pin 26b by the arm 25d of the intermediate member 25 only when the intermediate member 25 is pushed up on its slanting lug 25c by the ignition initiating member 20.

The flash bulb 27 is fired when struck on its leg 27a.

In the case where the foregoing construction is adapted for use of a flash unit incorporating a plurality of flash bulbs 27 or is provided with a holder 26 for a plurality of flash bulbs, the windows 26a and striking members 28 identical in number to the flash bulbs 27 to be mounted may be arranged in corresponding relation to the flash bulbs 27.

It will now be apparent that the first retaining member 21 releases the ignition initiating member 20 only when there is a need to use flashlight, while the second retaining member 22 releases the ignition initiating member 20 so as to fire the flash bulb in complete synchronism with the opening of the sector. Accordingly, the ignition initiating member 20 functions to fire the flash bulb by actuating the striking member 28 through the intermediate member 25 only when it is freed at its tensioned position from engagement with both of the two retaining members 21 and 22.

the release member 5, when returned upward, turns the intermediate member 25 in a clockwise direction, with the pin 5d on the member 5 in pushing engagement with the tail end 25b of the member 25 and permits the arm 25d thereof to retract downward from the window 26a of the holder 26. After firing of the flash bulb for exposure, therefore, the flash unit or the holder can be rotated a definite angle.

In the course of movement of the ignition initiating member 20 to the tensioned position, the projection 20c at its end is moved from the right side of the slanting lug 25c of the intermediate member 25, over the upper face of the lug 25c, to the illustrated tensioned position on the left, where the ignition initiating member 20 is brought into engagement with the stepped portion 21c of the first retaining member 21.

In each of the embodiments described above, the second retaining member 12 or 22 releases the ignition initiating member 10 or 20 every time the shutter is released, namely every time the sector is opened and closed irrespective of whether use of flashlight is necessary or not, but the first retaining member 11 or 21 keeps the ignition initiating member 10 or 20 from movement unless the need for flashlight exposure is detected. If flashlight was not used for exposure, the ignition initiating member 10 or 20, once freed from engagement with the second retaining member in synchronism with the opening and closing of the sector, will be engaged with the second retaining member again by the pin 10d or 20d being caught by the hook 12c or 22c.

Although each embodiment above is so designed that the shutter opening member 2 moves the second retaining member 12 or 22 to release the ignition initiating member 10 or 20, the second retaining member 12 or 22 may alternatively be operated by the arresting member 4 to free the ignition initiating member 10 or 20 when the sector opening member 2 is released from the arresting member 4 upon depression of release member 5.

With a shutter which is set primarily for speed or diaphragm aperture values, the exposure meter may of course incorporate means for modifying the position of its pointer in accordance with the individual values of shutter speed, diaphragm aperture or film speed.

I claim:

1. A mechanism for automatically firing a flash lamp in a camera including a shutter, comprising:
    a flash unit including a percussion ignitable flashlamp and a striking member releasably retained in a retracted tensioned position and movable along a flashlamp striking path;
    a flash determining means including a sensing element advanceable to flash and non-flash positions in response to the camera incident light being below and above a predetermined level respectively:
    a shutter opening member movable between a retracted position and an advanced position with the opening of said shutter:
    means for releasing said striking member, and normally being out of engagement with said striking member and responsive to the releasing of said shutter for nonreleasably engaging said striking member and responsive to the open position of said shutter for releasing said striking member and including an actuating member movable between a retracted position and an advanced striking member release position.

2. The mechanism of claim 1 wherein said flash determining means comprises an exposure meter including a movable needle, said sensing element being advanceable to a position responsive to the position of said needle.

3. The mechanism of claim 1 wherein said flash unit includes a plurality of said flash lamps and a plurality of said striking members and including means for advancing said actuating member into engagement with a striking member in the initial stage of said shutter release operation before the opening of said shutter.

4. The mechanism of claim 1 including a first retaining member releasably locking said actuating member in its retracted position and responsive to the advance of said shutter opening member from its retracted position for releasing said actuating member and a second retaining member releasably locking said actuating member in its retracted position and being restricted against release of said actuating member in response to said flash determining element being in said non-flash position whereby said actuating member is released only with the concurrent advance of said shutter opening member and the location of said flash determining member in flash position.

5. The mechanism of claim 4 wherein said flash determining means comprises an exposure meter including a movable needle, said sensing element being advanceable to a position responsive to the position of said needle and said needle being movable between first and second positions in and out of the path of said sensing element when said light is above and below said predetermined level respectively, said sensing element being advanced during the camera shutter release operation to a flash position actuating said second retaining member to its release position when said needle is in said second position and preventing the advance of said sensing element to said flash position when said needle is in said first position.

6. The mechanism of claim 4 wherein said first retaining member comprises a first portion located in the path of movement of said shutter opening member to be advanced with the advance of said shutter opening member and a retaining portion releasably engaging said actuating member and movable to an actuating member release position with the dvance of said first portion.

7. A mechanism for automatically firing a flash lamp in a camera including a shutter, comprising:
- a flash unit including at least one percussion ignitable flash lamp and one striking member releasably retained in a retracted tensioned position and movable along a flash lamp striking path, a socket detachably holding said flash unit;
- a shutter release member movable between retracted and advanced positions; shutter opening means actuatable in response to the advance of said shutter release member;
- a striking member release means for detecting the position of said striking member operable in response to the advance of said shutter release member to positions responsive to the cocked and uncocked positions of said striking member;
- a flash synchronizing means for releasing said striking member for connecting said shutter opening means with said striking member release means to fire said flash lamp in synchronism with opening of the shutter; and
- a brightness detecting means movable between first and second positions latching and unlatching said striking member release means when the brightness of an object is above and below a predetermined level respectively.

* * * * *